United States Patent
Park et al.

(10) Patent No.: US 9,490,502 B2
(45) Date of Patent: Nov. 8, 2016

(54) ELECTROLYTE AND RECHARGEABLE LITHIUM BATTERY INCLUDING THE SAME

(71) Applicant: SAMSUNG SDI CO., LTD., Yongin-si, Gyeonggi-do (KR)

(72) Inventors: Sun-Il Park, Yongin-si (KR); Young-Kee Kim, Yongin-si (KR); Sumihito Ishida, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 302 days.

(21) Appl. No.: 14/150,744

(22) Filed: Jan. 8, 2014

(65) Prior Publication Data

US 2014/0342243 A1    Nov. 20, 2014

(30) Foreign Application Priority Data

May 15, 2013 (KR) .................. 10-2013-0055053

(51) Int. Cl.
| | |
|---|---|
| H01M 6/04 | (2006.01) |
| H01M 4/13 | (2010.01) |
| H01M 4/58 | (2010.01) |
| H01M 6/16 | (2006.01) |
| H01M 10/0567 | (2010.01) |
| H01M 10/0525 | (2010.01) |
| H01M 10/0569 | (2010.01) |
| H01M 4/131 | (2010.01) |
| H01M 4/133 | (2010.01) |
| H01M 4/587 | (2010.01) |
| H01M 4/62 | (2006.01) |

(52) U.S. Cl.
CPC ........... *H01M 10/0567* (2013.01); *H01M 4/13* (2013.01); *H01M 10/0525* (2013.01); *H01M 10/0569* (2013.01); *H01M 4/131* (2013.01); *H01M 4/133* (2013.01); *H01M 4/587* (2013.01); *H01M 4/625* (2013.01); *H01M 2220/20* (2013.01); *H01M 2300/0028* (2013.01); *Y02E 60/122* (2013.01); *Y02T 10/7011* (2013.01)

(58) Field of Classification Search
CPC ........... H01M 10/0567; H01M 6/162; H01M 6/168; H01M 10/0525; H01M 10/0564
USPC ................................ 429/323, 199, 322, 338
See application file for complete search history.

(56) References Cited

U.S. PATENT DOCUMENTS

| | | | |
|---|---|---|---|
| 7,416,813 B2 | 8/2008 | Fujihara et al. | |
| 2011/0223476 A1 | 9/2011 | Kobayashi et al. | |
| 2012/0231325 A1 | 9/2012 | Yoon et al. | |
| 2013/0045427 A1* | 2/2013 | Zhamu .................. | H01M 4/38 429/403 |
| 2016/0013517 A1* | 1/2016 | Nakazawa .......... | H01M 10/052 429/200 |

FOREIGN PATENT DOCUMENTS

| | | |
|---|---|---|
| JP | 2007-165125 A | 6/2007 |
| JP | 2011-187410 A | 9/2011 |

(Continued)

*Primary Examiner* — Patrick Ryan
*Assistant Examiner* — Julian Anthony
(74) *Attorney, Agent, or Firm* — Lewis Roca Rothgerber Christie LLP

(57) ABSTRACT

An electrolyte for a rechargeable lithium battery, the electrolyte including a lithium salt, a non-aqueous organic solvent, a first additive represented by Chemical Formula 1, and a second additive represented by Chemical Formula 2 is disclosed. A rechargeable lithium battery including the electrolyte is also disclosed. The structures and definitions of the Chemical Formulae 1 and 2 are the same as described in the detailed description.

12 Claims, 2 Drawing Sheets

(56) References Cited

FOREIGN PATENT DOCUMENTS

| KR | 10-2006-0042201 A | 5/2006 |
| KR | 10-2012-0103519 A | 9/2012 |
| WO | WO 2011/070964 A1 | 6/2011 |

\* cited by examiner

ELECTROLYTE AND RECHARGEABLE LITHIUM BATTERY INCLUDING THE SAME

CROSS-REFERENCE TO RELATED APPLICATION

This application claims priority to and the benefit of Korean Patent Application No. 10-2013-0055053 filed in the Korean Intellectual Property Office on May 15, 2013, the entire contents of which are incorporated herein by reference.

BACKGROUND

1. Field

Aspects of embodiments according to the present invention are directed toward an electrolyte for a rechargeable lithium battery and a rechargeable lithium battery including the same.

2. Description of the Related Art

Recently, interest in technology for storing energy has increased. The technology of a battery has been widely used in devices ranging from a mobile phone, a camcorder, and a laptop PC to an electric car. A battery used as a power source for such electronic devices should have a high energy density.

Accordingly, a rechargeable lithium battery has been actively researched as a battery satisfying the requirements of such electronic devices. The rechargeable lithium battery includes an electrolyte, a positive electrode including a positive active material that can intercalate and deintercalate lithium and a negative electrode including a negative active material that can intercalate and deintercalate lithium.

SUMMARY

An aspect of one embodiment according to the present invention provides an electrolyte for a rechargeable lithium battery capable of concurrently (e.g., simultaneously) improving charge and discharge characteristics at high rates, cycle-life characteristics, and battery characteristics at a low temperature.

Another aspect of an embodiment according to the present invention provides a rechargeable lithium battery including the electrolyte.

According to one embodiment, an electrolyte for a rechargeable lithium battery includes a lithium salt, a non-aqueous organic solvent, a first additive including a first compound represented by the following Chemical Formula 1, and a second additive including a second compound represented by the following Chemical Formula 2.

Chemical Formula 1

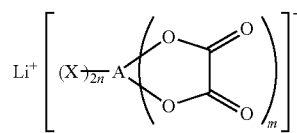

In the above Chemical Formula 1, A is boron (B) or phosphorus (P), X is a halogen element, n is an integer ranging from 0 to 2, m is an integer ranging from 1 to 3, when A is boron (B), n+m=2, and when A is phosphorus (P), n+m=3.

Chemical Formula 2

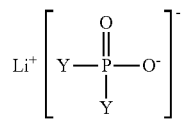

In the above Chemical Formula 2, Y is a halogen element.

The first compound may be represented by one of the following Chemical Formulae 1a to 1e.

Chemical Formula 1a

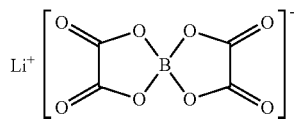

Chemical Formula 1b

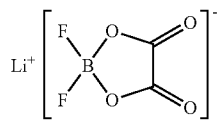

Chemical Formula 1c

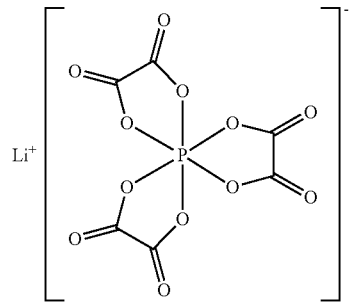

Chemical Formula 1d

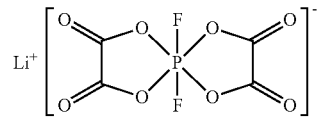

Chemical Formula 1e

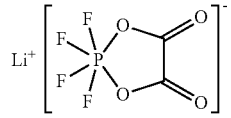

The second compound may be represented by the following Chemical Formula 2a.

Chemical Formula 2a

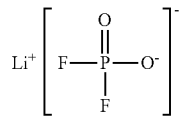

The first additive and the second additive may be each included in the electrolyte in an amount in a range of about 0.1 wt % to about 5 wt %, based on the total amount of the electrolyte.

The first additive and the second additive may be each included in the electrolyte in an amount in a range of about 0.5 wt % to about 1.5 wt %, based on the total amount of the electrolyte.

The first additive and the second additive may be included in the electrolyte in a weight ratio in a range of about 1:0.5 to about 1:1.5.

The first compound may be represented by the following Chemical Formula 1d, and the second compound may be represented by the following Chemical Formula 2a.

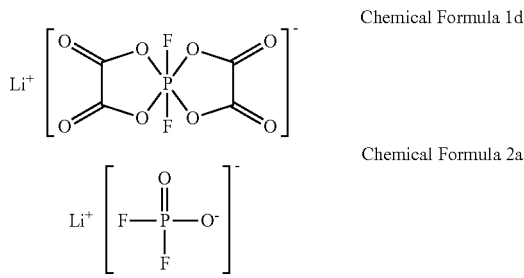

Chemical Formula 1d

Chemical Formula 2a

The non-aqueous organic solvent may include ethylene carbonate (EC), ethylmethyl carbonate (EMC) and dimethyl carbonate (DMC), and the ethylene carbonate (EC) may be included in the non-aqueous organic solvent in an amount of greater than or equal to about 20 wt %, based on the total amount of the non-aqueous organic solvent.

According to another embodiment, a rechargeable lithium battery includes a positive electrode including a positive active material layer, a negative electrode including a negative active material layer, and the electrolyte.

The positive active material layer may include lithium intercalation compound and activated carbon.

The activated carbon may be included in the positive active material layer in an amount in a range of about 0.01 wt % to about 20 wt %, based on the total amount of the lithium intercalation compound and the activated carbon.

The negative active material layer may include soft carbon.

The first additive and the second additive may be impregnated at a concentration in a range of about 0.005 wt % to about 2 wt % based on the amount of the electrolyte, in at least one of the positive electrode and the negative electrode.

The rechargeable lithium battery may further include a SEI film formed on the surface of the negative electrode.

Provided are an electrolyte simultaneously satisfying high charge and discharge characteristics at high rates (high C-rate), stable cycle-life characteristics, and stability at a low temperature required from a hybrid battery such as a battery for ISG (Integrated Starter & Generator) of an automobile, and a rechargeable lithium battery including the same. Accordingly, a battery having a smaller size but 5 times to 10 times longer cycle-life than a conventional battery and still high power characteristics may be manufactured.

BRIEF DESCRIPTION OF THE DRAWINGS

The accompanying drawings, together with the specification, illustrate embodiments of the present invention, and, together with the description, serve to explain the principles of the present invention.

DETAILED DESCRIPTION

Figure 1:
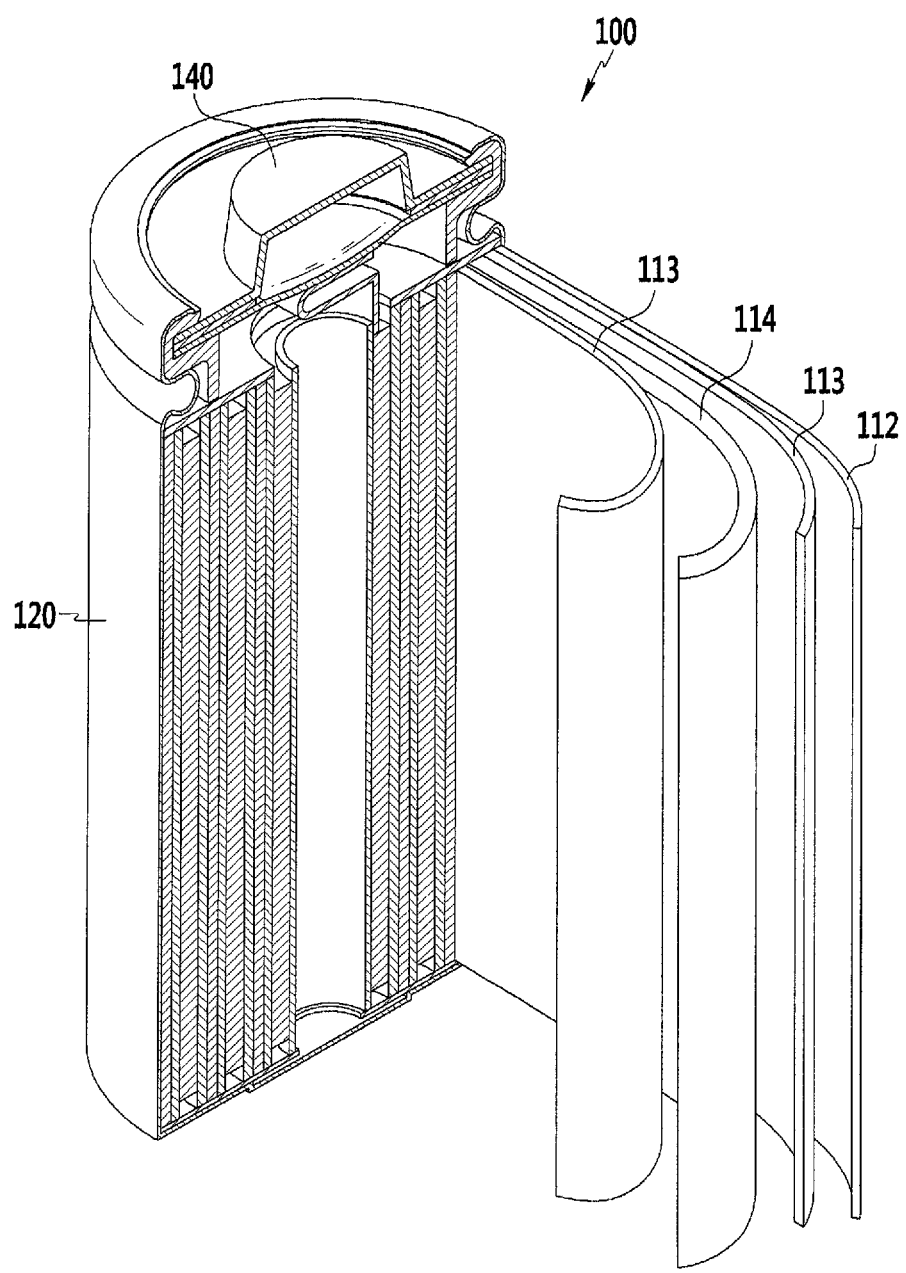
FIG. 1 is an exploded perspective view showing a rechargeable lithium battery according to one embodiment.

Hereinafter, embodiments of the present invention will be described in detail so that a person skilled in the art would understand. However, this disclosure may, however, be embodied in many different forms and is not construed as limited to the embodiments set forth herein. Indeed, in the following detailed description, only certain embodiments of the present invention are shown and described, by way of illustration. Also, in the context of the present application, when a first element is referred to as being "on" a second element, it can be directly on the second element or be indirectly on the second element with one or more intervening elements interposed therebetween. Like reference numerals designate like elements throughout the specification.

As used herein, when a definition is not otherwise provided, the term 'substituted' may refer to one (e.g., a compound) substituted with a halogen (F, Br, Cl or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, C6 to C15 cycloalkynyl group, a C2 to C20 heterocycloalkyl group, and a combination thereof, instead of hydrogen of a compound.

As used herein, when a definition is not otherwise provided, the term 'hetero,' for example as a prefix, may refer to one (e.g., a compound) including 1 to 3 hetero atoms selected from N, O, S, and P.

Expressions such as "at least one of," when preceding a list of elements, modify the entire list of elements and do not modify the individual elements of the list. Further, the use of "may" when describing embodiments of the present invention refers to "one or more embodiments of the present invention."

During the initial charge of a rechargeable lithium battery, lithium ions, which are released from a positive active material such as lithium-transition metal oxide are transferred to a negative active material where the ions are intercalated into the negative active material. Because of the high reactivity of lithium, a lithium salt reacts with the electrolyte at a surface of the negative active material, and a SEI (solid electrolyte interface) film is formed.

The SEI film acts as an ion tunnel, allowing the passage of lithium ions. Through an ion tunnel effect, the SEI film prevents (or reduces the likelihood of) disintegration of the structure of the negative electrode, which would otherwise be caused by co-intercalation of organic solvents having a high molecular weight along with solvated lithium ions into interlayers of the negative active material. Therefore, the electrolyte is prevented from contacting the negative active material (or the amount of contact between the electrolyte and the negative active material is reduced) and thereby decomposition of the electrolyte is prevented (or the amount of electrolyte decomposed is reduced), a lithium ion content of an electrolyte is reversibly maintained, and stable charge and discharge characteristics may be realized.

Accordingly, a stable SEI film relates to charge and discharge rates (C-rate) and cycle-life of a rechargeable lithium battery. For example, a stable SEI film is important for batteries for hybrid and electric cars, since a hybrid battery such as a battery for ISG (Integrated Starter & Generator) of an automobile simultaneously requires high charge and discharge rates (C-rate), stable cycle-life characteristics, and stability at a low temperature.

An electrolyte for a rechargeable lithium battery according to one embodiment includes a lithium salt, a non-aqueous organic solvent, and an additive.

In an embodiment, the lithium salt is dissolved in an organic solvent, supplies lithium ions in a rechargeable lithium battery, operates a basic operation of the rechargeable lithium battery, and improves lithium ion transportation between positive and negative electrodes of the battery.

Examples of the lithium salt may include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ wherein, x and y are natural numbers, LiCl, LiI, or a mixture thereof, but are not limited thereto.

The lithium salt may be used in a concentration in a range of about 0.1 M to about 2.0 M. When the lithium salt is included at the above concentration range, an electrolyte may have excellent performance and lithium ion mobility due to optimal electrolyte conductivity and viscosity.

The non-aqueous organic solvent serves as a medium for transmitting ions taking part in the electrochemical reaction of a battery.

The non-aqueous organic solvent may include a carbonate-based solvent.

The carbonate-based solvent may be dimethylcarbonate (DMC), diethylcarbonate (DEC), dipropylcarbonate (DPC), methylpropylcarbonate (MPC), ethylpropylcarbonate (EPC), ethylmethylcarbonate (EMC), ethylenecarbonate (EC), propylenecarbonate (PC), butylenecarbonate (BC), and the like.

For example, the carbonate-based solvent may include a combination of ethylene carbonate (EC), ethylmethyl carbonate (EMC), and dimethyl carbonate (DMC), wherein the ethylene carbonate (EC) may be included in the non-aqueous organic solvent in an amount of greater than or equal to about 20 wt %, and specifically about 20 wt % to about 90 wt %, based on the total amount of the non-aqueous organic solvent. When the ethylene carbonate (EC) is included within the foregoing range, a dielectric rate is increased, which may improve ionic conductivity.

The non-aqueous organic solvent may include an ester-based, ether-based, ketone-based, alcohol-based, or aprotic solvent as well as the carbonate-based solvent.

The ester-based solvent may include methyl acetate, ethyl acetate, n-propyl acetate, dimethylacetate, methylpropionate, ethylpropionate, gamma-butyrolactone, decanolide, gamma-valerolactone, mevalonolactone, caprolactone, and the like.

The ether-based solvent may include dibutyl ether, tetraglyme, diglyme, dimethoxyethane, 2-methyltetrahydrofuran, tetrahydrofuran, and the like, and the ketone-based solvent may include cyclohexanone, and the like.

The alcohol-based solvent may include ethanol, isopropyl alcohol, and the like, and the aprotic solvent may include nitriles such as R—CN (wherein R is a hydrocarbon group having a C2 to C20 linear, branched, or cyclic structure, and may include a double bond, an aromatic ring, or an ether bond) and the like; amides such as dimethylformamide or dimethylacetamide, and the like, dioxolanes such as 1,3-dioxolane, and the like, sulfolanes, and the like.

The non-aqueous organic solvent may be used singularly or in a mixture. When the organic solvent is used in a mixture, the mixture ratio may be controlled in accordance with suitable or desirable battery performance.

In an embodiment, the carbonate-based solvent is prepared by mixing a cyclic carbonate and a linear carbonate. The cyclic carbonate and the linear carbonate are mixed together at a volume ratio in a range of about 1:1 to about 1:9. Within this range, performance of the electrolyte may be improved.

The non-aqueous organic solvent of the present invention may further include an aromatic hydrocarbon-based organic solvent as well as the carbonate-based solvent. Herein, the carbonate-based solvent and aromatic hydrocarbon-based organic solvent may be mixed at a volume ratio in a range of about 1:1 to about 30:1.

Examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The additive may include a first additive including a first compound represented by the following Chemical Formula 1.

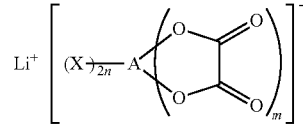

Chemical Formula 1

In the above Chemical Formula 1,
A is boron (B) or phosphorus (P),
X is a halogen element,
n is an integer ranging from 0 to 2,
m is an integer ranging from 1 to 3,
when A is boron (B), n+m=2, and
when A is phosphorus (P), n+m=3.

In an embodiment, the first additive is an oxalate borate-based compound and/or an oxalate phosphate-based compound, for example the first additive may include at least one of a lithium bis(oxalato) borate represented by the following Chemical Formula 1a, lithium difluoro(oxalato) borate represented by the following Chemical Formula 1b, lithium tris(oxalato) phosphate represented by the following Chemical Formula 1c, lithium difluoro bis(oxalato) phosphate represented by the following Chemical Formula 1 d, and lithium tetrafluoro(oxalato) phosphate represented by the following Chemical Formula 1e.

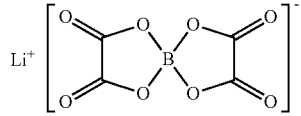

Chemical Formula 1a

-continued

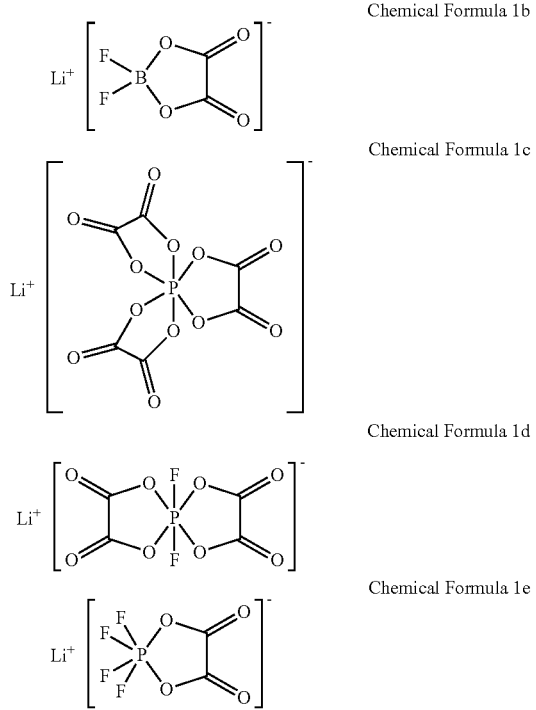

Chemical Formula 1b

Chemical Formula 1c

Chemical Formula 1d

Chemical Formula 1e

In an embodiment, the first compound of the first additive is a compound capable of forming a SEI film in a rechargeable lithium battery and may form a porous thin inorganic film on the surface of an electrode as the SEI film. When the SEI film is included in a rechargeable lithium battery, the rechargeable lithium battery may simultaneously satisfy high output and low temperature characteristics.

The first additive may be included in the electrolyte in an amount in a range of about 0.1 wt % to about 5 wt %, based on the total amount of the electrolyte. When the first additive is included within the foregoing range, a SEI film may have an appropriate (e.g., suitable) pore. Within the above range, the first additive may be included in the electrolyte in an amount in a range of about 0.5 wt % to about 1.5 wt %.

The second additive may include a second compound represented by the following Chemical Formula 2.

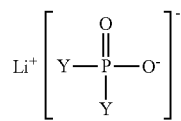

Chemical Formula 2

In the above Chemical Formula 2, Y is a halogen element.

The second compound of the second additive may play a role of suppressing formation of LiF due to a side reaction during formation of the SEI film by the first additive and improve output characteristics of a rechargeable lithium battery.

The second additive may be included in the electrolyte in an amount in a range of about 0.1 wt % to about 5 wt %, based on the total amount of the electrolyte. When the second additive is included within the foregoing range, the side reaction during formation of the SEI film may be effectively suppressed (or the amount of the side reaction may be reduced), and excellent ionic conductivity may be obtained. Within the above range, the second additive may be included in the electrolyte in an amount in a range of about 0.5 wt % to about 1.5 wt %.

The first additive and the second additive may be included in the electrolyte in a weight ratio of about 1:0.5 to about 1:1.5 while satisfying the above amount ranges. That is to say, a weight ratio of the second additive relative to that of the first additive may be from about 0.5 to about 1.5. When the first and second additives are included within the foregoing weight ratio range, charge and discharge characteristics at high rates, cycle-life characteristics, and battery characteristics at a low temperature may be improved.

The electrolyte includes the second additive as well as the first additive and thus, may form a stable SEI film. Accordingly, when the SEI film is applied to a rechargeable lithium battery, low temperature characteristics as well as charge and discharge characteristics at high rates and cycle-life characteristics may be improved.

According to another embodiment, a rechargeable lithium battery including the electrolyte is provided.

Rechargeable lithium batteries may be classified as lithium ion batteries, lithium ion polymer batteries, and lithium polymer batteries according to the presence of a separator and the kind of electrolyte used in the battery. The rechargeable lithium batteries may also be classified as cylindrical, prismatic, coin-type, or pouch-type batteries according to shapes, and may be classified as thin film or bulk batteries. Structures and manufacturing methods for lithium ion batteries pertaining to this disclosure are well known in the art.

FIG. 1 is an exploded perspective view of a rechargeable lithium battery according to one embodiment.

Referring to FIG. 1, the rechargeable lithium battery 100 according to one embodiment is a cylindrical battery that includes a negative electrode 112, a positive electrode 114, a separator 113 interposed between the negative electrode 112 and positive electrode 114, and an electrolyte impregnating the negative electrode 112, the positive electrode 114, and separator 113, a battery case 120, and a sealing member 140 sealing the battery case 120. The rechargeable lithium battery 100 is manufactured by sequentially stacking the negative electrode 112, positive electrode 114, and separator 113, and spiral-winding them and housing the wound resultant in the battery case 120.

In an embodiment, the negative electrode 112 includes a current collector and a negative active material layer formed on the current collector.

The current collector may include a copper foil, a nickel foil, a stainless steel foil, a titanium foil, a nickel foam, a copper foam, a polymer substrate coated with a conductive metal, or a combination thereof.

In an embodiment, the negative active material layer includes a negative active material, a binder and optionally a conductive material.

The negative active material may include a material that reversibly intercalates/deintercalates lithium ions, a lithium metal, a lithium metal alloy, a material being capable of doping and dedoping lithium, or a transition metal oxide.

In an embodiment, the material that reversibly intercalates/deintercalates lithium ions is a carbon material, and may be any generally-used carbon-based negative active material in a rechargeable lithium ion battery, and examples thereof may be crystalline carbon, amorphous carbon, or a combination thereof. Examples of the crystalline carbon may include a graphite, such as a shapeless, sheet-shaped, flake, spherical shaped or fiber-shaped natural graphite or artificial graphite, and examples of the amorphous carbon may include soft carbon, hard carbon, a mesophase pitch carbonized product, fired cokes, and the like.

For example, the soft carbon has higher output characteristics than graphite or hard carbon and is charged in a short time but has a low price and high stability and thus, is appropriate for a large capacity battery such as a battery for ISG (Integrated Starter & Generator) of an automobile.

The lithium metal alloy may include an alloy of lithium and a metal of Na, K, Rb, Cs, Fr, Be, Mg, Ca, Sr, Si, Sb, Pb, In, Zn, Ba, Ra, Ge, Al, or Sn.

The material being capable of doping and dedoping lithium may be Si, $SiO_x$ ($0<x<2$), a Si—C composite, a Si-Q alloy (wherein Q is an alkali metal, an alkaline-earth metal, Group 13 to 16 elements, a transition metal, a rare earth element, or a combination thereof, and not Si), Sn, $SnO_2$, a Sn—C composite, Sn—R (wherein R is an alkali metal, an alkaline-earth metal, Group 13 to 16 elements, a transition metal, a rare earth element, or a combination thereof, and not Sn), and the like. Examples of the Q and R may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The transition metal oxide may be vanadium oxide, lithium vanadium oxide, and the like.

The binder improves properties of binding negative active material particles with one another and the negative active materials with a current collector. Examples thereof may include polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves electrical conductivity of an electrode. Any suitable electrically conductive material may be used as a conductive material, unless it causes a chemical change. Examples thereof may include a carbon-based material such as natural graphite, artificial graphite, carbon black, acetylene black, ketjen black, a carbon fiber, and the like; a metal-based material such as a metal powder or a metal fiber and the like of copper, nickel, aluminum, silver, and the like; a conductive polymer such as a polyphenylene derivative and the like; or a mixture thereof.

In an embodiment, the positive electrode 114 includes a current collector and a positive active material layer formed on the current collector.

The current collector may be Al, but is not limited thereto.

In an embodiment, the positive active material layer includes a positive active material, a binder, and optionally a conductive material.

The positive active material may include lithiated intercalation compounds that reversibly intercalate and deintercalate lithium ions. Specifically, at least one lithium metal composite oxide of lithium and a metal of cobalt, manganese, nickel, or a combination thereof may be used, and examples thereof may be a compound represented by one of the following chemical formulae. $Li_aA_{1-b}R_bD_2$ ($0.90 \leq a \leq 1.8$ and $0 \leq b \leq 0.5$); $Li_aE_{1-b}R_bO_{2-c}D_c$ ($0.90 \leq a \leq 1.8$, $0 \leq b \leq 0.5$ and $0 \leq c \leq 0.05$); $Li_aE_{2-b}R_bO_{4-c}D_c$ ($0.90 \leq a \leq 1.8$, $0 \leq b \leq 0.5$, $0 \leq c \leq 0.05$); $Li_aNi_{1-b-c}Co_bR_cD_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Co_bR_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-c}Co_bR_cO_{2-\alpha}Z_2$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cD_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_2$ ($0.90 \leq a \leq 1.8$, $0 \leq b \leq 0.5$, $0 \leq c \leq 0.05$ and $0 < \alpha < 2$); $Li_aNi_bE_cG_dO_2$ ($0.90 \leq a \leq 1.8$, $0 \leq b \leq 0.9$, $0 \leq c \leq 0.5$ and $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ ($0.90 \leq a \leq 1.8$ and $0.001 \leq b \leq 0.1$); $Li_aCoG_bO_2$ ($0.90 \leq a \leq 1.8$ and $0.001 \leq b \leq 0.1$); $Li_aMnG_bO_2$ ($0.90 \leq a \leq 1.8$ and $0.001 \leq b \leq 0.1$); $Li_aMn_2G_bO_4$ ($0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

The positive active material may further include activated carbon as well as the lithium intercalation compound. The activated carbon may be included in a shape of, for example an activated carbon powder or activated carbon fiber and absorbs an electrolyte in a high amount due to a high effective specific surface area and thus, is appropriate for a battery for ISG (Integrated Starter & Generator) of an automobile requiring high power characteristics.

The activated carbon may be included in an amount in a range of about 0.01 wt % to about 20 wt % and specifically, in an amount in a range of about 1 wt % to about 10 wt %, based on the total amount of the lithium intercalation compound and the activated carbon.

The positive active material may include the positive active material with a coating layer, or a compound of the positive active material and the positive active material coated with the coating layer. The coating layer may include a coating element compound of an oxide of the coating element, a hydroxide of the coating element, an oxyhydroxide of the coating element, an oxycarbonate of the coating element, or a hydroxycarbonate of the coating element. The compound of the coating layer may be either amorphous or crystalline. The coating element included in the coating layer may include Mg, Al, Co, K, Na, Ca, Si, Ti, V, Sn, Ge, Ga, B, As, Zr, or a mixture thereof. The coating process may include any conventional processes (e.g., spray coating, dipping) as long as it does not causes any side effects on the properties of the positive active material, which is well known to persons having ordinary skill in this art, and therefore, a more detailed description thereof is omitted herein.

The binder improves binding properties of positive active material particles with one another and with a current collector. Examples of the binder may include polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves electrical conductivity of an electrode. Any suitable electrically conductive material may be used as a conductive material, unless it causes a chemical change. Examples thereof may include natural graphite, artificial graphite, carbon black, acetylene black, ketjen black, carbon fiber, copper, nickel, aluminum, silver, and the like, a metal powder, a metal fiber, and the like, and one or more kinds of a conductive material, such as a polyphenylene derivative and the like may be mixed.

The negative electrode 112 and the positive electrode 114 may be manufactured by mixing an active material, a conductive material, and a binder in a solvent to prepare an active material composition, and coating the composition on a current collector. The electrode manufacturing method is well known, and thus is not described in further detail in the present specification. The solvent may include N-methylpyrrolidone and the like, but is not limited thereto.

The electrolyte is the same (or substantially the same) as described above.

The first additive and the second additive of the electrolyte may remain (e.g., be impregnated) in at least one of the negative electrode 112 and the positive electrode 114, for example in each in an amount (e.g., a concentration) in a range of about 0.005 wt % to about 2 wt % based on the amount of the electrolyte.

The separator 113 may include anything commonly used in a lithium battery as long as it is capable of separating a negative electrode 112 from a positive electrode 114 and providing a transporting passage of lithium ions. In other words, it may have a low resistance to ion transport and an excellent impregnation for electrolyte. For example, it may be selected from a glass fiber, polyester, TEFLON® (tetrafluoroethylene, TEFLON® is a registered trademark of E.I. du Pont de Nemours and Company, Wilmington, Del.), polyethylene, polypropylene, polytetrafluoroethylene (PTFE), or a combination thereof. It may have a form of a non-woven fabric or a woven fabric. For example, for the lithium ion battery, a polyolefin-based polymer separator such as polyethylene, polypropylene or the like is mainly used. In order to ensure the heat resistance or mechanical strength, a coated separator including a ceramic component or a polymer material may be used. For example, the separator may have a mono-layered or multi-layered structure.

Hereinafter, the present disclosure is illustrated in more detail with reference to examples. However, these examples are for illustration, and the present disclosure is not limited thereto.

Manufacture of Rechargeable Lithium Battery Cell

Example 1

A 1.15M $LiPF_6$ solution was prepared by mixing ethylene carbonate (EC):ethylmethyl carbonate (EMC):dimethylcarbonate (DMC) in a volume ratio of 2:4:4 and adding $LiPF_6$ to the mixed solvent. Subsequently, 1.0 wt % of lithium difluoro bis(oxalate)phosphate (Li DFBOP) represented by the following Chemical Formula 1d and 1.0 wt % of lithium difluorophosphate represented by the following Chemical Formula 2a were added to the 1.15M $LiPF_6$ solution to prepare an electrolyte.

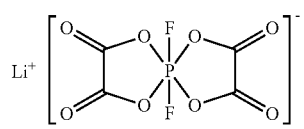

Chemical Formula 1d

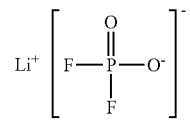

Chemical Formula 2a

A positive electrode slurry was prepared by mixing 85 wt % of $LiCoO_2$ as a positive active material and 5 wt % of activated carbon, adding 6 wt % of polyvinylidene fluoride (PVDF) as a binder and 4 wt % of acetylene black as a conductive material thereto and then, adding N-methyl-2-pyrrolidone thereto. The positive electrode slurry was coated on an aluminum foil and then, dried and compressed in a 120° C. vacuum oven, manufacturing a positive electrode.

A negative electrode slurry was prepared by mixing 85 wt % of soft carbon having an average diameter of 10 μm as a negative active material, 10 wt % of polyvinylidene fluoride as a binder, and 5 wt % of acetylene black as a conductive material and then, adding N-methyl-2-pyrrolidone thereto. The negative electrode slurry was coated on a copper foil and then, dried and compressed in a 120° C. vacuum oven, manufacturing a negative electrode.

Then, an electrode assembly was manufactured by using a 25 μm-thick porous separation film made of polyethylene as a separator between the positive and negative electrodes. The electrode assembly was spiral-wound, compressed, and inserted in a cylindrical can. The electrolyte was injected into the cylindrical can, and the can was sealed, manufacturing a 1.5 Ah rechargeable lithium battery cell.

Example 2

A rechargeable lithium battery cell was manufactured according to the same method as Example 1 except for adding 0.5 wt % of lithium difluorophosphate represented by the above Chemical Formula 2a.

Example 3

A rechargeable lithium battery cell was manufactured according to the same method as Example 1 except for adding 1.5 wt % of lithium difluorophosphate represented by the above Chemical Formula 2a.

Comparative Example 1

A rechargeable lithium battery cell was manufactured according to the same method as Example 1 except lithium difluoro bis(oxalate)phosphate (Li DFBOP) represented by the above Chemical Formula 1d and lithium difluorophosphate represented by the above Chemical Formula 2a were not used as an electrolyte additive.

Comparative Example 2

A rechargeable lithium battery cell was manufactured according to the same method as Example 1 except lithium difluorophosphate represented by the above Chemical Formula 2a was not used as an electrolyte additive.

Reference Example 1

A rechargeable lithium battery cell was manufactured according to the same method as Example 1 except for adding 5.0 wt % of lithium difluoro bis(oxalate)phosphate (Li DFBOP) represented by the above Chemical Formula 1d.

Reference Example 2

A rechargeable lithium battery cell was manufactured according to the same method as Example 1 except for adding 5.0 wt % of lithium difluorophosphate represented by the above Chemical Formula 2a.

Evaluation 1: Initial Capacity and Charge and Discharge Characteristics at High Rates The rechargeable lithium battery cells according to Examples 1 to 3, Comparative Examples 1 to 2, and Reference Examples 1 to 2 were charged under a constant current at a current of 0.3 A, and the charge was cut-off at a cell voltage of 4.2V. In addition, the rechargeable lithium battery cells were discharged under a constant current at a current of 0.3 A, and the discharge was cut-off at a cell voltage of 2.0V. The capacity of the rechargeable lithium battery cells was provided in the following Table 1, as initial capacity.

Then, ratios of 10 C, 30 C, and 50 C discharge capacities relative to 1 C discharge capacity were calculated and provided in the following Table 1.

TABLE 1

|  | Initial Capacity (mAh) | 10 C/1 C (%) | 30 C/1 C (%) | 50 C/1 C (%) |
| --- | --- | --- | --- | --- |
| Example 1 | 1435 | 99.3 | 97 | 93 |
| Example 2 | 1380 | 98.2 | 95.6 | 91.1 |
| Example 3 | 1410 | 99 | 96 | 92 |
| Comparative Example 1 | 1350 | 97.4 | 92 | 89 |
| Reference Example 1 | 1361 | 97.7 | 93 | 89.7 |
| Reference Example 2 | 1355 | 96.8 | 91.2 | 87.4 |

Referring to Table 1, the rechargeable lithium battery cells according to Examples 1 to 3 showed high initial capacity and excellent rate capability compared with those of the rechargeable lithium battery cells according to Comparative Example 1, and Reference Examples 1 to 2.

Evaluation 2: Cycle-Life Characteristics

The rechargeable lithium battery cells according to Examples 1 to 3, Comparative Examples 1 to 2, and Reference Examples 1 to 2 were 1000 times repetitively charged at a current of 15 A up to 4.2V and discharged at a current of 15 A up to 2.0V, and then, residual capacity % of the rechargeable lithium battery cells at the 1000th discharge capacity based on the initial discharge capacity was calculated. The results are provided in the following Table 2.

In addition, the rechargeable lithium battery cells were charged at the current of 0.3 A up to 4.2V and allowed to stand in a charge rate state of 100% for one month, and voltage drop rates thereof were measured and provided in the following Table 2.

TABLE 2

|  | 10 C/10 C 1000 cycles (%) | Voltage (V): one month later after reaching 4.2 V |
| --- | --- | --- |
| Example 1 | 97.4 | 3.79 |
| Example 2 | 94 | 3.57 |
| Example 3 | 96 | 3.71 |
| Comparative Example 1 | 81.7 | 3.43 |
| Reference Example 1 | 85.4 | 3.44 |
| Reference Example 2 | 78 | 3.21 |

Referring to Table 2, the rechargeable lithium battery cells according to Examples 1 to 3 showed higher 1000th residual capacity and higher voltage after allowed to stand for one month than the rechargeable lithium battery cells according to Comparative Example 1, and Reference Examples 1 to 2. In other words, the rechargeable lithium battery cells according to Examples 1 to 3 showed excellent cycle-life characteristics compared with the rechargeable lithium battery cells according to Comparative Example 1, and Reference Examples 1 to 2.

Evaluation 3: Low Temperature Characteristics

First, the rechargeable lithium battery cells according to Examples 1 to 3, Comparative Examples 1 to 2, and Reference Examples 1 to 2 were full-charged at 0.2 C at room temperature (25° C.) and then, discharged at 5 C at −20° C., and then, discharge capacities thereof were compared and provided in the following Table 3.

TABLE 3

|  | 5 C discharge (−20° C.)/0.2 C (RT) (%) |
| --- | --- |
| Example 1 | 91 |
| Example 2 | 88 |
| Example 3 | 88.3 |
| Comparative Example 1 | 65 |
| Comparative Example 2 | 74 |
| Reference Example 1 | 71.0 |
| Reference Example 2 | 61.5 |

Referring to Table 3, the rechargeable lithium battery cells according to Examples 1 to 3 showed higher discharge capacity at a low temperature than the rechargeable lithium battery cells according to Comparative Examples 1 to 2, and Reference Examples 1 to 2 and thus, excellent low temperature characteristics.

Second, low-temperature characteristics were examined through a cold cranking ampere (CCA) method using battery packs. The battery packs were manufactured by using the rechargeable lithium battery cells according to Example 1 and Comparative Examples 1 and 2, i.e., three types of battery packs such as 3S6P (module 1), 3S5P (module 2), and 3S4P (module 3). The cold cranking ampere (CCA) method was performed by putting the battery packs into a −20° C. chamber, discharging the battery packs at a predetermined (e.g., set) current in a full-charge state, and obtaining voltage variations according to time. The results are provided in FIG. 2.

Figure 2:
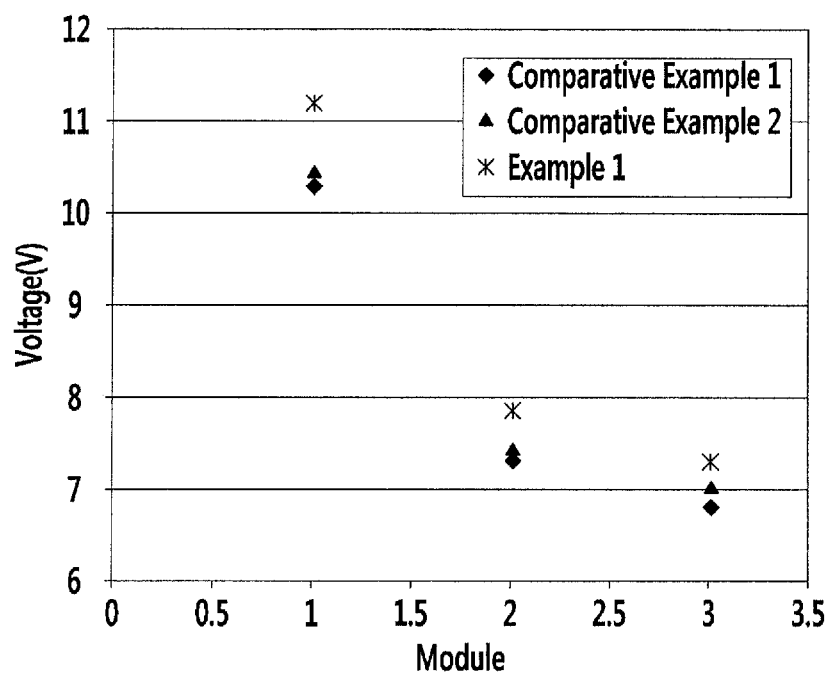
FIG. 2 is a graph showing low temperature characteristics of rechargeable lithium batteries according to Example 1 and Comparative Examples 1 and 2.

FIG. 2 is a graph showing low temperature characteristics of the rechargeable lithium battery cells according to Example 1 and Comparative Examples 1 and 2.

Referring to FIG. 2, the rechargeable lithium battery according to Example 1 showed small voltage change compared with the rechargeable lithium battery cells according to Comparative Examples 1 and 2. Accordingly, the rechargeable lithium battery cell according to Example 1 showed excellent low temperature characteristics compared with the rechargeable lithium battery cells according to Comparative Examples 1 and 2.

Based on the above results, the rechargeable lithium battery according to Examples 1 to 3 showed high charge and discharge characteristics at high rates, improved cycle-life characteristics, and stable characteristics at a low temperature.

In other words, the rechargeable lithium battery cell according to Examples 1 to 3 showed high charge and discharge characteristics at high rates, improved cycle-life characteristics, and stable characteristics at a low temperature compared with the rechargeable lithium battery cell using no additives represented by Chemical Formulae 1 and 2 according to Comparative Example 1, the rechargeable lithium battery cell using an additive represented by Chemical Formula 1 according to Comparative Example 2, and the rechargeable lithium battery cells according to Reference Examples 1 and 2, which included additives in amounts outside of the ranges described above.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An electrolyte for a rechargeable lithium battery, comprising:
   a lithium salt;
   a non-aqueous organic solvent;
   a first additive comprising a first compound represented by Chemical Formula 1:

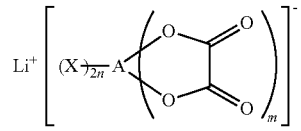

Chemical Formula 1 wherein,
A is boron (B) or phosphorus (P),
X is a halogen element,
n is an integer ranging from 0 to 2,
m is an integer ranging from 1 to 3,
when A is boron (B), n+m=2, and
when A is phosphorus (P), n+m=3; and
a second additive comprising a second compound represented by Chemical Formula 2:

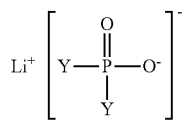

Chemical Formula 2 wherein Y is a halogen element, and
wherein the first additive and the second additive are each included in the electrolyte in an amount in a range of about 0.5 wt % to about 1.5 wt %, based on the total amount of the electrolyte.

2. The electrolyte of claim 1, wherein the first compound is represented by one of Chemical Formulae 1a to 1e:

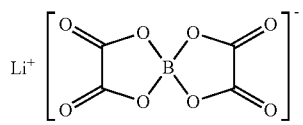

Chemical Formula 1a

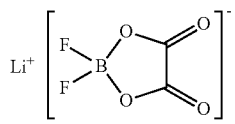

Chemical Formula 1b

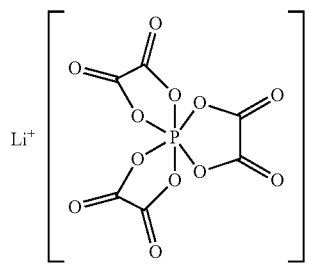

Chemical Formula 1c

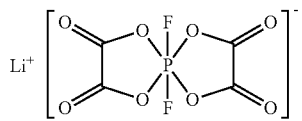

Chemical Formula 1d

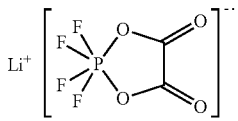

Chemical Formula 1e

3. The electrolyte of claim 1, wherein the second compound is represented by Chemical Formula 2a:

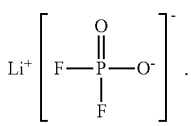

Chemical Formula 2a

4. The electrolyte of claim 1, wherein the first additive and the second additive are included in the electrolyte in a weight ratio in a range of about 1:0.5 to about 1:1.5.

5. The electrolyte of claim 1, wherein the first compound is represented by Chemical Formula 1d:

Chemical Formula 1d

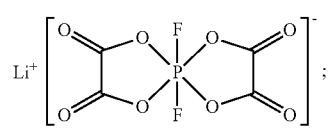

and
the second compound is represented by Chemical Formula 2a:

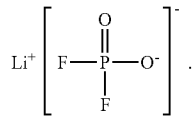

Chemical Formula 2a

6. The electrolyte of claim 1, wherein the non-aqueous organic solvent comprises ethylene carbonate (EC), ethylmethyl carbonate (EMC), and dimethyl carbonate (DMC), and
the ethylene carbonate (EC) is included in the non-aqueous organic solvent in an amount of greater than or equal to about 20 wt %, based on the total amount of the non-aqueous organic solvent.

7. A rechargeable lithium battery, comprising:
a positive electrode comprising a positive active material layer;
a negative electrode comprising a negative active material layer; and
the electrolyte according to claim 1.

8. The rechargeable lithium battery of claim 7, wherein the positive active material layer comprises lithium intercalation compound and activated carbon.

9. The rechargeable lithium battery of claim 8, wherein the activated carbon is included in the positive active material layer in an amount in a range of about 0.01 wt % to about 20 wt %, based on the total amount of the lithium intercalation compound and the activated carbon.

10. The rechargeable lithium battery of claim 8, wherein the negative active material layer comprises soft carbon.

11. The rechargeable lithium battery of claim 7, wherein the first additive and the second additive are impregnated at a concentration in a range of about 0.005 wt % to about 2 wt % based on the amount of the electrolyte, in at least one of the positive electrode and the negative electrode.

12. The rechargeable lithium battery of claim 7, wherein the negative electrode further comprises a solid electrolyte interface (SEI) film on the surface of the negative electrode.

* * * * *